United States Patent
Konstanzer

(10) Patent No.: US 9,205,812 B2
(45) Date of Patent: Dec. 8, 2015

(54) PARKING LOCK

(71) Applicant: Neumayer Tekfor Holding GmbH, Hausach (DE)

(72) Inventor: Steffen Konstanzer, Boetzingen (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 241 days.

(21) Appl. No.: 13/866,707

(22) Filed: Apr. 19, 2013

(65) Prior Publication Data

US 2013/0228413 A1  Sep. 5, 2013

Related U.S. Application Data

(63) Continuation of application No. PCT/DE2011/001865, filed on Oct. 18, 2011.

(30) Foreign Application Priority Data

Oct. 21, 2010  (DE) .......................... 10 2010 049 172

(51) Int. Cl.
*F16D 11/10* (2006.01)
*B60T 1/00* (2006.01)
(Continued)

(52) U.S. Cl.
CPC ................. *B60T 1/005* (2013.01); *B60T 1/062* (2013.01); *F16D 63/006* (2013.01); *F16H 63/3441* (2013.01)

(58) Field of Classification Search
CPC ..... B60T 1/005; B60T 1/062; F16H 63/3441; F16H 63/643416; F16D 63/006
USPC .......... 192/219.4, 219.6, 69.9, 114 T; 188/31, 188/71.1; 74/339
See application file for complete search history.

(56) References Cited

U.S. PATENT DOCUMENTS 2,368,868 A  2/1945  Orr
3,301,078 A  1/1967  Michael
(Continued)

FOREIGN PATENT DOCUMENTS

DE  1 072 105  10/1952
DE  237457  12/1964
(Continued)

OTHER PUBLICATIONS

International Search Report with English translation dated Apr. 26, 2012 (eight (8) pages).

(Continued)

*Primary Examiner* — Robert Hodge
*Assistant Examiner* — Ryan Dodd
(74) *Attorney, Agent, or Firm* — Crowell & Moring LLP

(57) ABSTRACT

A parking lock device of a gearbox is provided. The device includes a gearbox shaft, a gearbox housing, a locking ring which may be displaced axially along the gearbox shaft, a control ring which may be moved axially relative to the locking ring and the gearbox shaft. A movement of the control ring relative to the locking ring axially along the gearbox shaft causes an axial movement of the locking ring axially along the gearbox shaft, and the control ring displaces the locking ring in an activated state axially along the gearbox shaft to a predetermined axial position along the gearbox shaft. The gearbox shaft, the gearbox housing and the locking ring are designed and adapted to one another in such a way that in an activated state of the locking ring there is a positive engagement between the gearbox shaft, the gearbox housing and the locking ring.

3 Claims, 2 Drawing Sheets

(51) Int. Cl.
  *B60T 1/06* (2006.01)
  *F16D 63/00* (2006.01)
  *F16H 63/34* (2006.01)

(56) References Cited

U.S. PATENT DOCUMENTS

| | | | |
|---|---|---|---|
| 5,695,030 A * | 12/1997 | Medcalf, Jr. | 192/220.2 |
| 8,851,260 B2 * | 10/2014 | Reisch et al. | 192/85.18 |
| 2005/0178638 A1 | 8/2005 | Kramer et al. | |

FOREIGN PATENT DOCUMENTS

| | | |
|---|---|---|
| DE | 1 530 602 | 7/1969 |
| DE | 1 800 164 A1 | 7/1970 |
| DE | 199 42 362 C1 | 1/2001 |
| EP | 1 035 358 A2 | 9/2000 |

OTHER PUBLICATIONS

German Search Report with partial English translation dated Apr. 4, 2011 (nine (9) pages).

* cited by examiner

PARKING LOCK

CROSS REFERENCE TO RELATED APPLICATIONS

This application is a continuation of PCT International Application No. PCT/DE2011/001865, filed Oct. 18, 2011, which claims priority under 35 U.S.C. §119 from German Patent Application No. 10 2010 049 172.1, filed Oct. 21, 2010, the entire disclosures of which are herein expressly incorporated by reference.

BACKGROUND AND SUMMARY OF THE INVENTION

The invention relates to a parking lock device of a gearbox.

The relevant legislation stipulates that a parking lock device for dual clutch transmissions with a torque converter reliably and positively stops in the parking position on a hill that has a slope of up to 30%. For this purpose the prior art usually employs a parking lock device, wherein a parking gearwheel, which is securely mounted on the shaft of the gearbox, has recesses incorporated on the outside diameter. When parking, a pawl engages with these recesses and braces the gearbox against the housing. One drawback lies in the fact that the parking gearwheel is always entrained in rotation, thereby incurring losses. Furthermore, there is a high installation space requirement.

The object of the present invention is to propose a parking lock device that overcomes the drawbacks of the prior art.

The invention achieves this engineering object by the fact that at least one gearbox shaft is provided; that at least one gearbox housing is provided; that at least one locking ring is provided, wherein the locking ring can be displaced axially along the gearbox shaft, and wherein the gearbox shaft and the locking ring are arranged relative to one another in such a way that they coaxially surround one another; that at least one control ring is provided, wherein the control ring can be axially displaced relative to the locking ring and relative to the gearbox shaft; that the control ring and the locking ring are arranged relative to one another in such a way that they coaxially surround one another; that at least one movement of the control ring relative to the locking ring axially along the gearbox shaft causes an axial movement of the locking ring axially along the gearbox shaft, wherein the control ring displaces directly or offset in time the locking ring in an activated state axially along the gearbox shaft to a predetermined axial position along the gearbox shaft; that at least the gearbox shaft, the gearbox housing and the locking ring are designed and adapted to one another in such a way that at least in an activated state of the locking ring there is a positive engagement at least between the gearbox shaft, the gearbox housing and the locking ring. As a result, in the event that the parking lock device is engaged or more specifically is activated, a locking ring, which can be moved on the shaft of the gearbox, is displaced axially along the gearbox shaft and then facilitates a positive engagement between the gearbox shaft and the gearbox housing. Owing to this positive engagement, the gearbox shaft is fixed directly in relation to the gearbox housing and, in so doing, is locked. Between the movement of the control ring and the locking ring there can be, if desired, a time offset.

One embodiment of the invention includes that in at least one axial position relative to the gearbox shaft the locking ring is mounted in a rotationally rigid manner in relation to the gearbox shaft. Thus, the locking ring is guided in an outer contour of the gearbox shaft, for example, by an inner contour; or it moves into such a rotationally rigid, but axially movable guide upon activation of the parking lock device.

One embodiment of the invention provides that the gearbox housing has an interior space; and that the locking ring and/or the control ring is/are arranged outside the interior space. This embodiment can reduce the installation space of the housing.

One embodiment of the invention includes that the gearbox shaft, the gearbox housing, the control ring and the locking ring are designed and adapted to one another in such a way that in an activated state of the locking ring there is a positive engagement between the gearbox shaft, the gearbox housing, the control ring and the locking ring. In this embodiment the locking ring and the control ring accomplish together that a positive engagement is produced.

One embodiment of the invention provides that at least one spring element is arranged between the control ring and the locking ring. Such a spring element enables the control ring to move the locking ring.

One embodiment of the invention includes that the gearbox shaft has at least one outer contour; that the locking ring has at least one inner contour; and that the outer contour and the inner contour are adapted to one another. As a result, the contours are designed in such a way that the result will be a jamming between the locking ring and the gearbox shaft, or more specifically that the locking ring is guided or rather is mounted on the shaft of the gearbox in such a way that it is rotationally rigid in the radial direction.

One embodiment of the invention provides that the gearbox shaft is mounted in the gearbox housing by a shaft bearing.

One embodiment of the invention includes that a sealing ring is provided for the purpose of sealing off between the gearbox shaft and the gearbox housing.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
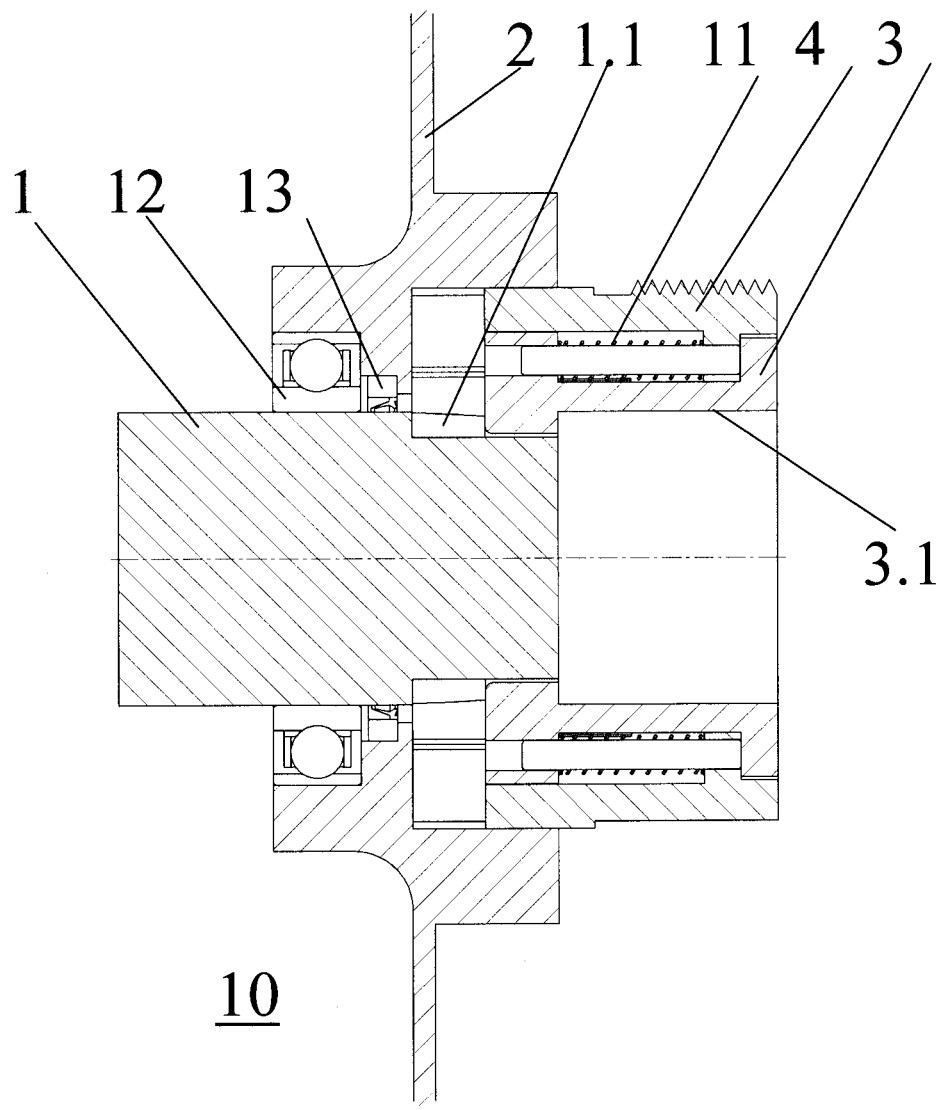
FIG. 1 is a sectional view of an inventive parking lock device in the open state in accordance with an embodiment of the present invention.

FIG. 1 is a sectional view of a part of the gearbox housing 2. Of the actual gearbox only one section of the gearbox shaft 1 can be seen. The gearwheels, which are not shown in this embodiment, may be found on the gearbox shaft, which is mounted in the gearbox housing 2 by means of a shaft bearing 12. The gearbox housing 2 encloses the interior space 10. In this embodiment the transition between the gearbox shaft 1 and the gearbox housing 2 is sealed off by means of a sealing ring 13. The axially movable locking ring 3, which is mounted in a rotationally rigid manner, is arranged on the end of the gearbox shaft 1 that projects from the interior space 10. In this case the outer contour 1.1 of the gearbox shaft 1 and the inner contour 3.1 of the locking ring 3 are designed and adapted to one another, for example, by suitable elevations, grooves and recesses or rather depressions. The locking ring 3 can be constructed either as a single piece or as multiple pieces. In this case the single-piece design variant is shown. A control ring 4 is arranged coaxially about the locking ring 3. This control ring can also be moved in the axial direction. For this purpose there is preferably a device (not illustrated) that in this embodiment engages, for example, with the outer contour of the control ring 4, said outer contour exhibiting a grid pattern. Between the control ring 4 and the locking ring 3 there is a spring element 11, the spring force of which acts along the axis of the gearbox shaft 1.

FIG. 1 shows the case that the parking lock device is not activated. Since in this non-activated state there is adequate play between the locking ring 3 and the gearbox shaft 1, the gearbox shaft 1 rotates without being influenced by the components of the parking lock device. If the parking lock device is activated, then the locking ring 4 in this exemplary embodiment is moved in the direction of the gearbox housing 2, thereby tensioning the spring element 11. The control ring 4 can be moved, in particular, at any time and in any position. In this embodiment the locking ring 3 moves when the formed elements are in a suitable position and, induced by the spring element 11, also in the direction of the gearbox housing 2 until at that point it reaches the end stop. This activated state is shown in FIG. 2.

Figure 2:
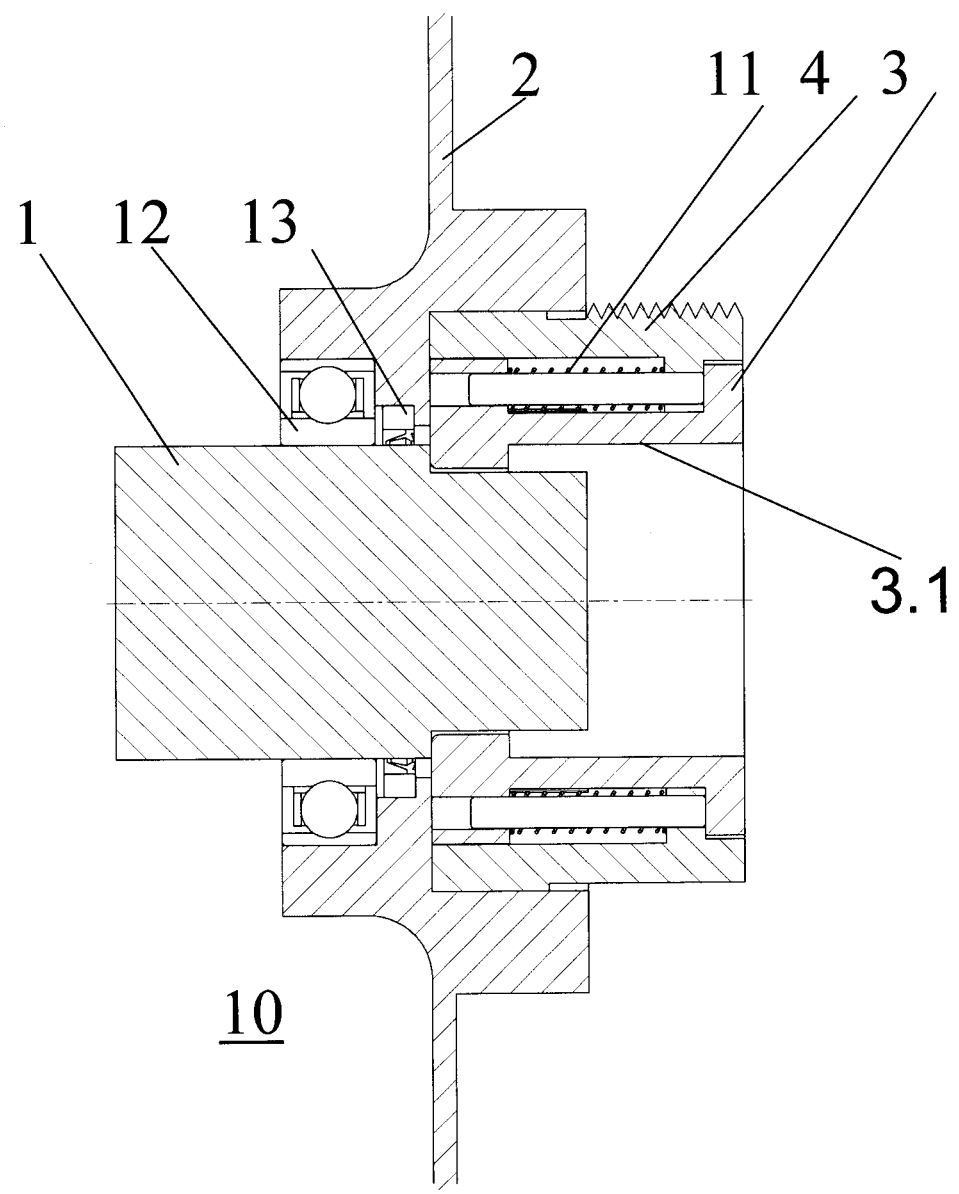
FIG. 2 shows the parking lock device from FIG. 1 in the closed state or more specifically in the activated state.

In FIG. 2 the locking ring 3 and the control ring 4 may be found (in a rotationally rigid manner) between the gearbox shaft 1 and the gearbox housing 2 and form there a positive engagement. This positive engagement connects the gearbox shaft 1 to the gearbox housing 2 and prevents the gearbox shaft 1 from rotating in relation to the gearbox housing 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A parking lock device of a gearbox, comprising:
   at least one gearbox shaft having an outer contour;
   at least one gearbox housing;
   at least one locking ring having an inner contour; and
   at least one control ring,
   wherein
   the locking ring is configured to be displaceable axially along the gearbox shaft,
   said outer contour and said inner contour are adapted to one another such that in an axial position of said locking ring along said gearbox shaft said locking ring is rotationally fixed relative to said gearbox shaft,
   the gearbox shaft and the locking ring are concentrically arranged such that one of the gearbox shaft and the locking ring at least partially overlaps the other, said locking ring concentrically surrounding said gearbox shaft,
   the control ring is axially displaceable relative to the locking ring and relative to the gearbox shaft,
   the control ring and the locking ring are concentrically arranged such that one of the control ring and the locking ring at least partially overlaps the other, said control ring concentrically surrounding said locking ring and said gearbox shaft,
   at least one movement of the control ring relative to the locking ring axially along the gearbox shaft causes an axial movement of the locking ring axially along the gearbox shaft, and
   said axial movement of said locking ring causing a positive engagement between said gearbox shaft and said gearbox housing via said control ring and said locking ring, in which positive engagement said control ring and said locking ring being located in a rotationally rigid manner between said gearbox shaft and said gearbox housing.

2. The parking lock device as claimed in claim 1, wherein the gearbox housing has an interior space, said locking ring and said control ring being arranged outside the interior space, and said gearbox shaft being mounted in the gearbox housing by a shaft bearing.

3. The parking lock device as claimed claim 1, wherein at least one spring element is arranged between the control ring and the locking ring.

\* \* \* \* \*